March 1, 1938. A. J. SCHOLTES 2,110,096
RELEASABLE INTERNALLY EXPANDING HOSE COUPLING
Filed July 14, 1937
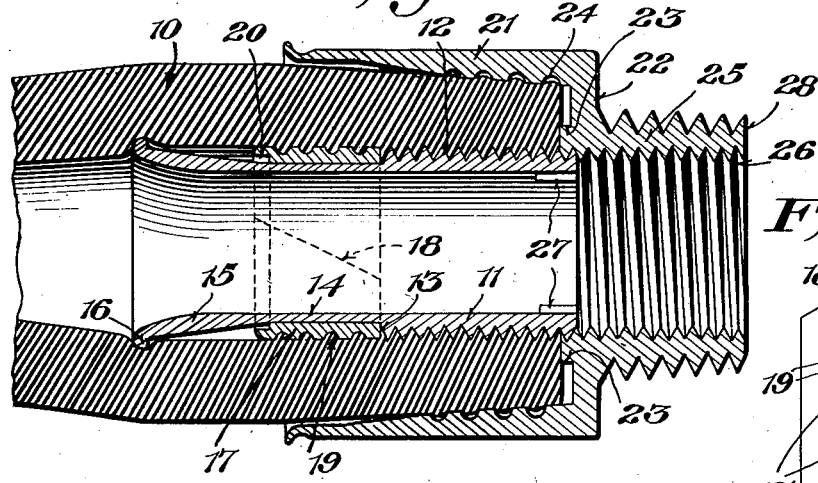
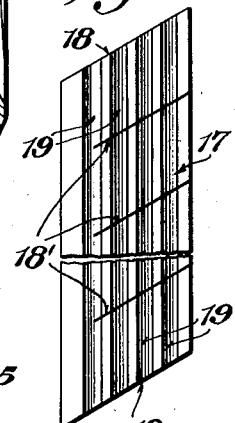
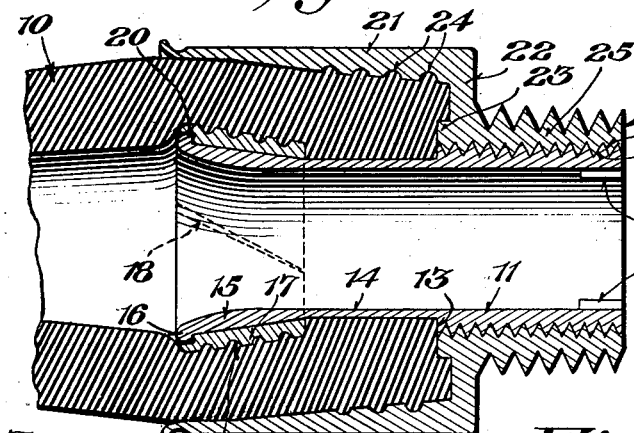
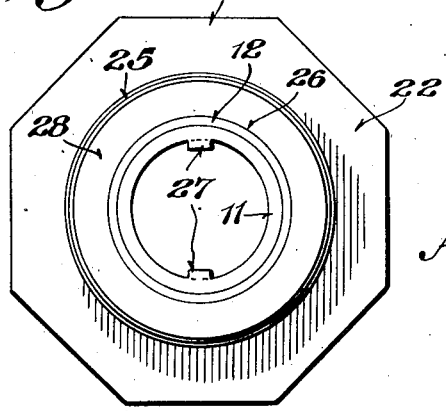
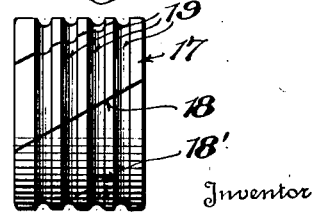
Inventor
Albert J. Scholtes,
By Mawhinney & Mawhinney,
Attorneys Patented Mar. 1, 1938

2,110,096

UNITED STATES PATENT OFFICE 2,110,096

RELEASABLE INTERNALLY EXPANDING HOSE COUPLING

Albert J. Scholtes, Baltimore, Md.

Application July 14, 1937, Serial No. 153,631

8 Claims. (Cl. 285—82)

The present invention relates to hose couplings, and has for an object to provide an internally expanding coupling which is releasable and removable, and may repeatedly be used upon the wearing out of hose section, and otherwise where removal is desired.

This invention is an improvement over my prior patent for an Interlocking hose coupling and seal No. 2,059,040, granted October 27, 1936, and is adapted particularly to rubber hose capable of expansion and compression, and embodies a coupling which is not permanent in that it does not depend upon the use of expanding tools for permanently deforming the inner part of the coupling to hold it to the hose, but which has cooperating parts including expanding means which works only upon the hose itself to expand the hose into the coupling to seal and secure the coupling thereto, and which may be released to free the hose from the coupling.

Another object of this invention is to provide a hose coupling of this type comprising relatively few parts and which has an outer sleeve or nut portion detachably threaded to an inner or nipple portion so that the sleeve portion may be reversed upon the end of the nipple portion to facilitate the introduction of the nipple portion into the end of a pipe and to determine the correct initial position of the nipple in the hose.

A further object of this invention is to provide a coupling with inner and outer members, an abutment wall for the extremity of the hose and with an internal expander which not only expands the hose into this outer member, but also has an endwise wedging and compressing movement toward the abutment wall for squeezing and crowding the free end of the hose into the threads and other crevices within the outer member and about the inner member and against the abutment wall; with the result that the hose end is practically molded into the coupling members and firmly held and effectively sealed therein.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a longitudinal section taken through a horizontal coupling embodying the features of this invention and as initially applied to the end of a hose.

Figure 2 is a like view showing the coupling secured in final position on the hose.

Figure 3 is an outer end view of the coupling.

Figure 4 is a detail side elevation of one form of expanding means which may be used in the coupling, and Figure 5 is a flat plan view of the expanding means of Figure 4 laid out to show the relation of the diagonal split and the intermediate diagonal slits for equalizing the expansion of the means.

The present invention is adapted for use in connection with a hose 10 which is of the usual type and capable of expansion and compression. The coupling comprises a nipple 11 adapted to be inserted in the end of the hose 10 and provided at its outer end portion with external threads 12 terminating in a rearwardly facing shoulder 13. The outer surface of the nipple 11 has an intermediate smooth or cylindrical portion 14 extending rearwardly from the shoulder 13 and terminating in a flared or conical rear end part or section 15. The conical section 15 terminates in an annular bead or shoulder 16, and the inner wall of the flared or conical part 15 may be correspondingly flared at the rear end of the nipple to reduce objectionable obstructions in the hose and coupling so that water and the like may freely flow therethrough.

Slidably mounted upon the intermediate or cylindrical portion 14 of the nipple is an expanding means 17. This expanding means may be of any suitable construction to accomplish the purpose, and in the present instance, as shown in detail in Figures 4 and 5, comprises a split flat ring of substantially the length of the cylindrical portion 14 and which has a diagonal split 18 extending entirely through or across one side thereof from its forward edge rearwardly at an axial inclination substantially opposite the direction of the threads 12 of the nipple. The ring 17 also has a suitable number of slits 18' which are spaced about the ring to insure the uniform expansion thereof at all points, the slits 18' extending from the rear edge of the ring 17 forwardly at substantially the same angle as the split 18 but terminating a short distance from the forward edge of the ring 17. The slits 18' and the split 18 admit of the ready expansion of the rear end of the ring 17 to a greater degree than the front end of the ring so that the ring 17 may lay flat on and assume the angle of the conical rear end 15 of the nipple.

The outer surface of the expansion ring 17 is provided with a plurality of annular grooves 19, or other suitable friction means, adapted to frictionally engage against the inner wall of the hose 10 for anchoring the ring 17 thereagainst. The ring 17 is adapted to expand and to expand the hose 10 when the nipple 11 is moved axially outward in the end of the hose to advance the conical or flaring section 15 into the ring, as shown in Figure 2. The ring 17 is provided at its rear edge with an internal groove 20 proportioned to receive therein the annular shoulder 16 at the base of the conical section 15, and the rear end of the ring and the rear end of the conical section 15 are preferably correspondingly rounded so as to interfit and provide a relatively smooth continuous surface portion for embedding in the inner wall of the hose 10, as shown in Figure 2.

An external sleeve or nut 21 is adapted to engage over the end of the hose 10, and at its forward end is provided with an abutting shoulder 22 for engaging the extremity of the hose 10. Preferably, the shoulder 22 has an annular rib 23 at its inner marginal portion to insure the compression and sealing of the inner layer of the hose which, in some instances, is composed of synthetic rubber. The inner wall of the sleeve 21 flares rearwardly from the shoulder 22 for a considerable distance to provide a conical inner wall so as to gradually contract the free end of the hose 10 as the sleeve 21 is advanced over the hose, and to hold the free end of the hose in contracted or compressed position about the nipple 11. The rear end of the sleeve 21 is preferably internally smooth and cylindrical to fit tightly about the adjacent portion of the hose 10. The inner conical wall of the sleeve 21 is preferably provided with a spiral groove 24 increasing in depth toward the shoulder 22 and adapted to engage in the outer surface portion of the hose 10 to facilitate advancement of the sleeve 21 over the hose end and for holding the sleeve firmly thereto, and also for the purpose of providing a suitable roughened and frictional surface for anchoring the hose in the sleeve when the hose is wedged and compressed therein.

The sleeve 21 is also provided with an attaching spud 25 extending forwardly from the shoulder 22 and which is externally threaded for interengagement with a second coupling. The spud 25 is also provided with internal threads 26 adapted to engage and cooperate with the threads 12 of the nipple for axially advancing the nipple outwardly in the sleeve 21 upon the turning of the nipple in the sleeve.

In the preferred operation of the invention the nipple 11 is adapted to be turned within the sleeve and the end of the hose. This may be accomplished by a suitable expanding tool for engaging the inner wall of the nipple 11 with sufficient frictional contact to rotate the nipple. If desired, lugs or projections 27 may be provided upon the inner wall of the nipple adjacent its forward end to facilitate engagement of a tool with the nipple for turning the latter.

Before the coupling parts are applied to the end of the hose 10, the outer end of the nipple 11 may be threaded a short distance into the outer end 28 of the spud 25 by reversing the position of the sleeve 21 with respect to the nipple 11 from that shown in Figure 1. The sleeve 21 may thus serve as a handle for not only holding the nipple in position and forcing the nipple into the open end of the hose 10, but the outer end 28 of the spud provides a shoulder adapted to engage the extremity of the hose 10 and limit the insertion of the nipple so that only the small portion of the nipple which is threaded into the spud is left projecting from the hose after the outer end of the spud 25 has been unscrewed from the outer end of the nipple.

The sleeve 21 is now reversed into its coupling position and is moved up on the free end of the hose 10 as shown in Figure 1. This may be facilitated by screwing or turning the sleeve 21 so that the spiral groove 24, in the inner wall of the sleeve, may take into the exterior surface of the hose 10 and advance or feed the sleeve 21 into the position shown in Figure 1.

During the final turning of the sleeve 21, in advancing the same over the hose 10, the inner end of the threaded portion 26 of the spud 25 is screwed upon the outer projecting end of the nipple 11. This is shown in Figure 1. During this time the expansion ring 17 is carried upon the cylindrical part 14 of the nipple and against the shoulder 13 thereof. The nipple 11 is now turned within the spud 25 in a direction to advance the nipple axially outward in the spud and in the end of the hose. The frictional contact of the ring 17 with the inner wall of the hose 10 is sufficient to anchor the split ring 17 against axial movement with the nipple so that the inner flaring end 15 of the nipple is gradually drawn into the rear end of the ring 17. This expands the ring 17 so that in its final position the ring 17 lies flat upon the conical end 15 of the nipple and is held thereto by the shoulder 16 and assumes the conical shape of the end 15, slits 18' and the split 18 admitting of the necessary flaring or expansion of the rear portion of the ring 17. At the same time the outward movement of the nipple 11 urges the ring 17 and its adjacent hose portion forwardly within the sleeve 21.

As soon as the split ring 17 seats against the stop shoulder 16, the ring 17 is in expanded condition upon the conical section 15 and is carried forwardly with the nipple. The expander or ring 17 presents an outer conical surface on substantially the same angle as the conical or inclined inner wall of the sleeve 21. As the expander or ring 17 moves axially outward it contracts the space between the ring 17 and the sleeve 21 and compresses the hose into a neck portion between the ring and the sleeve, and with an outward thrust on the hose end which compresses the latter into intimate and sealing contact with all surfaces and crevices within the coupling and causes the material of the end of the hose to expand into an enlarged head portion shaped to the configuration of the space between the sleeve 21 and nipple 11 forwardly of the ring 17.

It is obvious that various changes and modifications may be made in the details of construction and design of the above specifically described embodiment of this invention without departing from the spirit thereof, such changes and modifications being restricted only by the scope of the following claims.

What is claimed is:

1. A releasable internally expanding hose coupling, comprising a nipple for insertion into the end of a hose, an external sleeve for engagement over and against the end of the hose and having a relatively axially movable connection with the nipple, and expanding means carried by the nipple for engagement against the inner wall of the hose and operable by the axial movement of the nipple in the sleeve and the hose to expand the hose and bind the same in said sleeve.

2. A releasable internally expanding hose coupling, comprising a nipple for insertion into the end of a hose, an external sleeve for engagement over the end of the hose and having threaded engagement with the outer end of the nipple and adapted to be turned up thereon against the end of the hose, and an expanded member rotatably mounted on the nipple for frictional contact with the inner wall of the hose to expand the same in the sleeve upon the relative axial movement of the nipple with respect to the sleeve.

3. In a hose coupling, a sleeve for engagement about the end of a hose, a nipple for insertion in the end of the hose, said nipple adapted for movement relatively to the sleeve, and freely mounted expanding means on the nipple to engage the inner wall of the hose, said nipple having an expander part for engaging said expanding means to expand the same and the hose in the sleeve upon axial movement of the nipple.

4. A detachable hose coupling, comprising a nipple for insertion in the end of a hose and having a flaring portion at its inner end, an expansible element mounted on the nipple for slidable engagement thereon and over said flaring portion and having an exterior friction surface for engaging the inner wall of the hose to anchor the expansible element while the nipple is drawn outwardly therethrough, and an outer member adapted for engagement over the end of the hose for confining the same and having threaded engagement with the outer end of said nipple, whereby turning of the nipple in the outer member and in the hose end moves the nipple outwardly through the expansible element and expands the same against the inner wall of the hose for binding the latter with a wedging and outwardly compressing movement in said outer member.

5. A detachable hose coupling, comprising an outer member adapted to fit over the end of a hose, an inner member threaded in the outer end of the outer member and adapted for insertion into the end of a hose and having a shouldered inner end, and expanding means rotatably carried on the inner member for contact with the inner wall of the hose, said inner member adapted to be turned in the outer member to advance the inner member outwardly to engage the shoulder of the inner member against the expanding means, and adapted to be further advanced outwardly for wedging and compressing the hose into the outer member.

6. A releasable internally expanding hose coupling, comprising a nipple for insertion into the end of a hose, an external sleeve for engagement over and against the end of the hose and having a relatively axially movable connection with the nipple, said sleeve having its inner wall flaring rearwardly, and expanding means carried by said nipple for engagement against the inner wall of the hose and operable by the axial movement of the nipple in the sleeve and the hose to expand the hose and bind the same against the flaring inner wall of said sleeve.

7. A detachable hose coupling, comprising a nut for engagement over the end of a hose and having an abutting shoulder to engage the extremity of the hose, said nut having an inner wall flaring outwardly from the shoulder and provided with a coarse spiral groove therein for engaging the outer surface portion of the hose to feed the nut thereover and hold the nut on the hose, a nipple for insertion in the end of the hose and threaded at its outer end in the outer end of the nut and adapted to be turned therein and in the hose and to move the nipple outwardly, and clamping means carried by the nipple within the hose for contact against the inner wall of the hose for binding the same in the nut and compressing the end of the hose outwardly against said abutment shoulder when the nipple is moved outwardly.

8. A releasable internally expanding hose coupling, comprising a nipple for insertion in the end of a hose and having an outer threaded part, an intermediate smooth cylindrical part and an inner flaring conical part terminating in an annular stop shoulder, a split flat ring slidably mounted on the intermediate part of the nipple and having an outer friction surface for engagement with the inner wall of the hose and for expanding the same upon axial movement of the nipple through the ring to advance the conical part of the nipple into the ring, and an external sleeve for engagement over the end of the hose having a ribbed abutting shoulder facing the extremity of the hose to engage the latter and having an inner wall flaring backwardly from the shoulder with a spiral groove therein to engage the outer surface portion of the hose and hold the sleeve thereon, said sleeve having a reduced spud at its outer end externally threaded for receiving a coupling element thereon and provided with internal threads for receiving the threaded portion of the nipple, said nipple having internal lugs adjacent its outer end for receiving a tool to turn the nipple in the sleeve and hose end for advancing the conical inner end into the split ring for expanding the same and the hose in the sleeve with an outward thrust against said abutting shoulder and expanding and binding the hose end between the sleeve and its shoulder and the cylindrical portion of the nipple.

ALBERT J. SCHOLTES.